(12) United States Patent
Arimilli et al.

(10) Patent No.: US 7,007,128 B2
(45) Date of Patent: Feb. 28, 2006

(54) MULTIPROCESSOR DATA PROCESSING SYSTEM HAVING A DATA ROUTING MECHANISM REGULATED THROUGH CONTROL COMMUNICATION

(75) Inventors: Ravi Kumar Arimilli, Austin, TX (US); Jerry Don Lewis, Round Rock, TX (US); Vicente Enrique Chung, Austin, TX (US); Jody Bern Joyner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 10/752,835

(22) Filed: Jan. 7, 2004

(65) Prior Publication Data

US 2005/0149660 A1 Jul. 7, 2005

(51) Int. Cl.
*G06F 13/00* (2006.01)
(52) U.S. Cl. .................. 710/316; 710/305; 712/10; 712/28; 712/29; 370/439
(58) Field of Classification Search ........... 710/305, 710/316; 712/10, 28, 29; 370/439
See application file for complete search history.

(56) References Cited

U.S. PATENT DOCUMENTS

| | | | | |
|---|---|---|---|---|
| 3,308,436 | A | * | 3/1967 | Borck, Jr. et al. ............ 712/10 |
| 4,402,045 | A | * | 8/1983 | Krol ........................... 712/29 |
| 5,097,412 | A | * | 3/1992 | Orimo et al. ................. 703/22 |
| 5,179,715 | A | * | 1/1993 | Andoh et al. ............... 718/100 |
| 5,504,918 | A | * | 4/1996 | Collette et al. .............. 712/29 |
| 5,606,686 | A | * | 2/1997 | Tarui et al. ................. 711/121 |
| 5,671,430 | A | * | 9/1997 | Gunzinger ................... 712/28 |
| 5,918,249 | A | * | 6/1999 | Cox et al. ................... 711/203 |
| 6,178,466 | B1 | * | 1/2001 | Gilbertson et al. ............ 710/3 |
| 6,246,692 | B1 | * | 6/2001 | Dai et al. ................... 370/438 |
| 6,421,775 | B1 | * | 7/2002 | Brock et al. .................. 713/1 |
| 6,519,649 | B1 | * | 2/2003 | Arimilli et al. ............. 709/232 |
| 6,519,665 | B1 | * | 2/2003 | Arimilli et al. ............. 710/110 |
| 6,526,467 | B1 | * | 2/2003 | Joh ........................... 710/305 |
| 6,529,999 | B1 | * | 3/2003 | Keller et al. ................ 711/141 |

(Continued)

OTHER PUBLICATIONS

"Omega-Crossbar Network," Oct. 1, 1984, IBM technical Disclosure Bulletin, vol. 27, No. 5, p. 2811-2816.*

Primary Examiner—Glenn A. Auve
Assistant Examiner—Donna K. Mason
(74) Attorney, Agent, or Firm—Casimer K. Salys; Dillon & Yudell LLP

(57) ABSTRACT

A data interconnect and routing mechanism reduces data communication latency, supports dynamic route determination based upon processor activity level/traffic, and implements an architecture that supports scalable improvements in communication frequencies. In one implementation, a data processing system includes at least first through third processing units, data storage coupled to the plurality of processing units, and an interconnect fabric. The interconnect fabric includes at least a first data bus coupling the first processing unit to the second processing unit and a second data bus coupling the third processing unit to the second processing unit so that the first and third processing units can transmit data traffic to the second processing unit. The data processing system further includes a control channel coupling the first and third processing units. The first processing unit requests approval from the third processing unit via the control channel to transmit a data communication to the second processing unit, and the third processing unit approves or delays transmission of the data communication in a response transmitted via the control channel.

14 Claims, 4 Drawing Sheets

U.S. PATENT DOCUMENTS

| | | | |
|---|---|---|---|
| 6,591,307 B1 * | 7/2003 | Arimilli et al. | 713/375 |
| 6,728,841 B1 * | 4/2004 | Keller | 711/146 |
| 6,820,158 B1 * | 11/2004 | Lee et al. | 710/305 |
| 6,848,003 B1 * | 1/2005 | Arimilli et al. | 709/232 |
| 6,901,491 B1 * | 5/2005 | Kohn et al. | 711/157 |
| 2004/0088523 A1 * | 5/2004 | Kessler et al. | 712/29 |
| 2004/0117510 A1 * | 6/2004 | Arimilli et al. | 709/253 |
| 2005/0021699 A1 * | 1/2005 | Kota et al. | 709/221 |
| 2005/0060473 A1 * | 3/2005 | Duncan et al. | 710/305 |
| 2005/0091473 A1 * | 4/2005 | Aguilar et al. | 712/28 |

* cited by examiner

MULTIPROCESSOR DATA PROCESSING SYSTEM HAVING A DATA ROUTING MECHANISM REGULATED THROUGH CONTROL COMMUNICATION

CROSS REFERENCE TO RELATED PATENTS AND APPLICATIONS

The present application is related to U.S. Pat. No. 6,519,649, U.S. patent application Ser. No. 10/425,421, and U.S. patent applicant Ser. No. 10/752,959, which are commonly assigned to the assignee of the present application and are incorporated herein by reference in their entireties.

BACKGROUND OF THE INVENTION

1. Technical Field

The present invention relates in general to data processing systems and in particular to multiprocessor data processing systems. Still more particularly, the present invention relates to a data interconnect and data routing mechanism for a multiprocessor data processing system.

2. Description of the Related Art

It is well known in the computer arts that greater computer system performance can be achieved by harnessing the collective processing power of multiple processing units. Multi-processor (MP) computer systems can be designed with a number of different architectures, of which various ones may be better suited for particular applications depending upon the intended design point, the system's performance requirements, and the software environment of each application. Known MP architectures include, for example, the symmetric multiprocessor (SMP) and non-uniform memory access (NUMA) architectures. It has generally been assumed that greater scalability, and hence greater performance, is obtained by designing more hierarchical computer systems, that is, computer systems having more layers of interconnects and fewer processing unit connections per interconnect.

The present invention recognizes, however, that the communication latency for transactions between processing units within a conventional hierarchical interconnect architecture is a significant impediment to improved system performance and that the communication latency for such conventional hierarchical systems grows with system size, substantially reducing the performance benefits that could otherwise be achieved through increasing system scale. To address these performance and scalability issues, above-referenced U.S. Pat. No. 6,519,649 introduced a scalable non-hierarchical segmented interconnect architecture that improves the communication latency of address transactions and associated coherency responses. While the non-hierarchical segmented interconnect architecture of U.S. Pat. No. 6,519,649 improves communication latency for addresses and associated coherency messages, it would be useful and desirable to provide an enhanced data interconnect and data routing mechanism that decreases the latency and improves the efficiency of data communication between processing units.

SUMMARY OF THE INVENTION

In view of the foregoing, the present invention provides a data processing system having an improved data interconnect and data routing mechanism. In one embodiment, a data processing system includes at least first through third processing units, data storage coupled to the plurality of processing units, and an interconnect fabric. The interconnect fabric includes at least a first data bus coupling the first processing unit to the second processing unit and a second data bus coupling the third processing unit to the second processing unit so that the first and third processing units can transmit data traffic to the second processing unit. The data processing system further includes a control channel coupling the first and third processing units. The first processing unit requests approval from the third processing unit via the control channel to transmit a data communication to the second processing unit, and the third processing unit approves or delays transmission of the data communication in a response transmitted via the control channel.

The data interconnect and routing mechanism of the present invention reduces data communication latency and supports dynamic route determination based upon processor activity level/traffic. In addition, the data interconnect and routing mechanism of the present invention implements an architecture that support improvements in communication frequencies that will scale with ever increasing processor frequencies.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
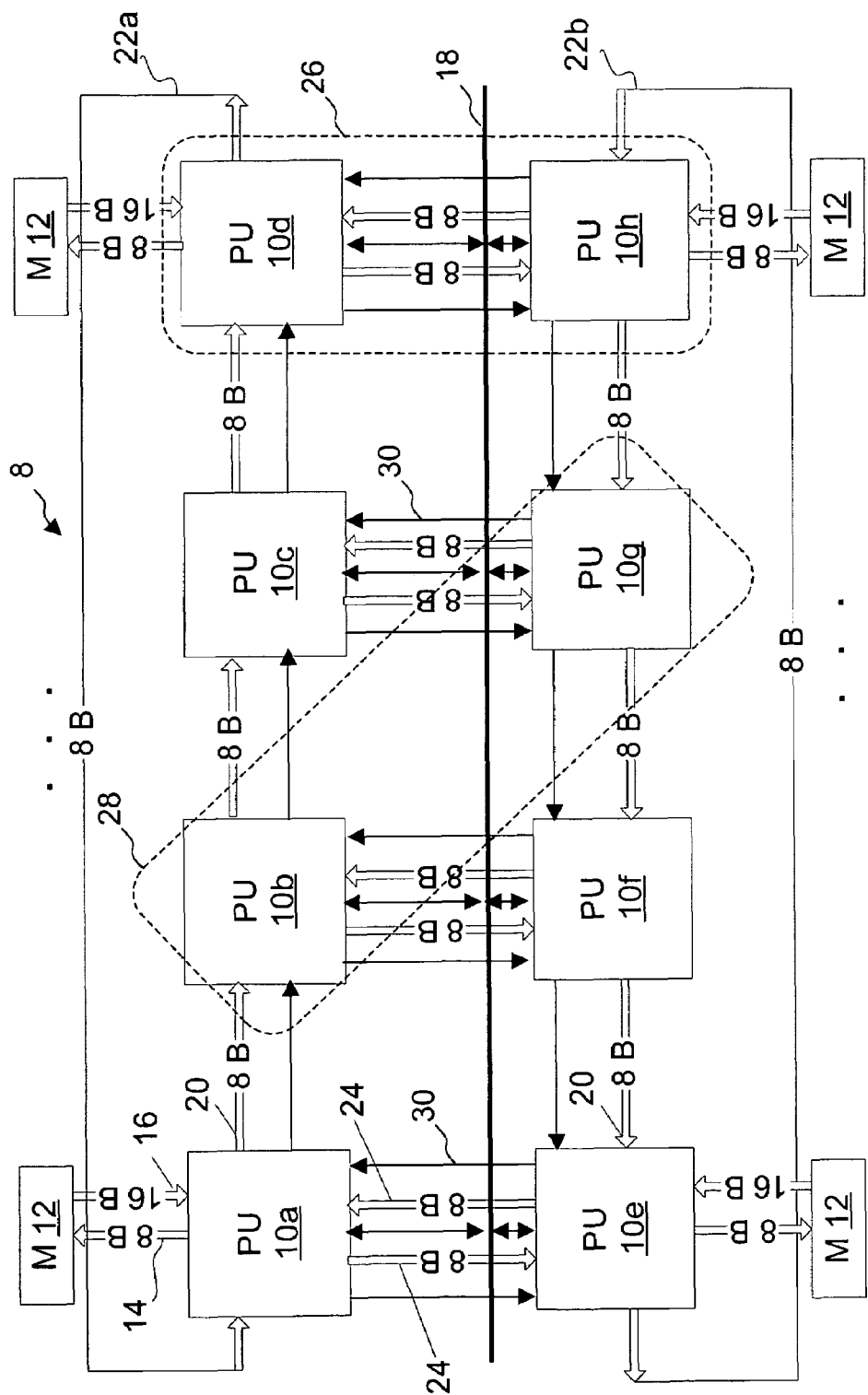
FIG. 1 is a high-level block diagram of a data processing system including a data interconnect and data routing mechanism in accordance with one embodiment of the present invention.

With reference now to the figures, and in particular, with reference to FIG. 1, there is illustrated a high level block diagram of a multi-processor data processing system 8 having a data interconnect and data routing mechanism in accordance with one embodiment of the present invention. The data interconnect and routing mechanism of the present invention provides a high frequency, low latency, scalable structure that permits data to be efficiently routed among multiple processing units within a multi-processor data processing system.

As shown, data processing system 8 includes a number of processing units (PUs) 10a–10h for processing instructions and data, generally under the control of software and/or firmware. PUs 10, which may be homogeneous or heterogeneous, are preferably physically arranged in a two (or more) dimensional array including two or more rows (or series) of PUs 10. That is, PUs 10*a*–10*d* form a first row (or first series), and PUs 10*e*–10*h* form a second row (or second series). Although each PU 10 in the first row comprising PUs 10*a*–10*d* preferably has a corresponding PU 10 in the second row comprising 10*e*–10*h*, such symmetry is not required by the present invention. However, the pairing of PUs 10, as shown, advantageously permits each such processing "book" 26 of two or more PUs 10 to be conveniently packaged, for example, within a single multi-chip module (MCM). Such packaging permits a variety of systems of different scales to be easily constructed by coupling a desired number of processing books 26.

To provide storage for software instructions and/or data, one or more of PUs 10 may be coupled to one or more memories 12. For example, in the illustrated embodiment, PUs 10*a*, 10*d*, 10*e* and 10*h* (and possibly others of PUs 10) are each coupled to a respective memory 12 via a unidirectional 8-byte memory request bus 14 and a unidirectional 16-byte memory data bus 16. Memories 12 include a shared memory region that is generally accessible by some or all of PUs 10*b*. It will be appreciated that other storage architectures may alternatively be employed with the present invention.

Data access requests, cache management commands, coherency responses, data, and other information is communicated between PUs 10 via one or more switched, bused, hybrid and/or other interconnect structures referred to herein collectively as the "interconnect fabric." In FIG. 1, address and coherency response traffic is communicated among PUs 10 via an address and response interconnect 18, a preferred embodiment of which is disclosed in detail in above-referenced U.S. Pat. No. 6,519,649 and is accordingly not described further herein. Data communications, on the other hand, are conveyed between PUs 10 utilizing a bused data interconnect architecture illustrated in detail in FIG. 1 and described hereinbelow.

As depicted, the data interconnect of FIG. 1 includes a segmented data channel for each series of PUs 10. Thus, for example, the first series of PUs comprising PUs 10*a*–10*d* is interconnected by a first segmented data channel formed of a first set of data buses 20, and the second series of PUs comprising PUs 10*e*–10*h* is interconnected by a second segmented data channel formed by another set of data buses 20. In a preferred embodiment, data buses 20 are unidirectional in the direction indicated in FIG. 1 by arrows, have a uniform data bandwidth (e.g., 8 bytes), and are bus-pumped interfaces having a common transmission frequency governed by clocks within PUs 10.

The data interconnect of data processing system 8 further includes a bi-directional bused interface coupling each PU 10 to a corresponding PU 10, if any, in an adjacent row. For example, in the depicted embodiment, each PU 10 is coupled to the corresponding PU 10 in the adjacent row by two unidirectional data buses 24, which are preferably, but not necessarily, identical to data buses 20. The distance between PUs 10, and hence the lengths of data buses 20 and 24, are preferably kept to a minimum to support high transmission frequencies.

The data interconnect of data processing system 8 may optionally further include one or more data buses 22 that form a closed loop path along one or more dimensions of the array of PUs 10. For example, FIG. 1 illustrates an embodiment in which a data bus 22*a* couples PU 10*d* to PU 10*a*, and a data bus 22*b* couples PU 10*e* to PU 10*h*, forming a respective closed loop path for each row of PUs 10. Of course, in other embodiments, closed loop path(s) may alternatively or additionally be formed in other dimensions of the array of PUs 10, for example, by coupling PU 10*a* to PU 10*e* through an additional "vertical" data bus (not illustrated) other than data buses 24.

As with the data buses 20, 24, higher communication frequencies can be achieved with data buses 22 if bus lengths are minimized. Accordingly, it is generally advantageous to minimize the lengths of data buses 22, for example, by physically arranging processing books 26 in a cylindrical layout that minimizes the distance between PUs 10*d*, 10*h* and PUs 10*a*, 10*e*. If a cylindrical layout is not possible or undesirable for other design considerations, data buses 22 can alternatively be implemented with lower transmission frequencies than data buses 20, 24 in order to permit longer bus lengths. It should also be noted that although data buses 22 preferably have the same data bandwidth as data buses 20 and 24 (e.g., 8 bytes) as depicted in FIG. 1, data buses 22 may alternatively be implemented with different bandwidth(s), as design considerations dictate.

With the illustrated configuration, data may be transmitted in generally clockwise loops or portions of loops of varying size formed by one or more data buses 20 and/or one or more data buses 24. Multiple routes between a source PU 10 and a destination PU 10 are possible, and the number of possible routes increases if data buses 22 are implemented. For example, PU 10*b* may respond to a data access request by PU 10*g* (received by PU 10*a* via address and response interconnect 18) by outputting the requested data on its associated data bus 20, which data will then be received by PU 10*c*. PU 10*c* may then transmit the data to PU 10*g* via its data bus 24, or may alternatively transmit the data to PU 10*g* via PUs 10*d* and 10*h* and their associated data buses 24 and 20, respectively. As described further below, data communications are preferably routed by PUs 10 along a selected one of the multiple possible routes in accordance with a priority schema and a destination (e.g., PU or route) identifier and, optionally, based upon inter-PU control communication. Inter-PU control communication, which may be unidirectional (as shown) or bidirectional, is conveyed by control buses 30. Importantly, data communication between PUs 10 is not retryable by PUs 10 in a preferred embodiment.

Figure 2:
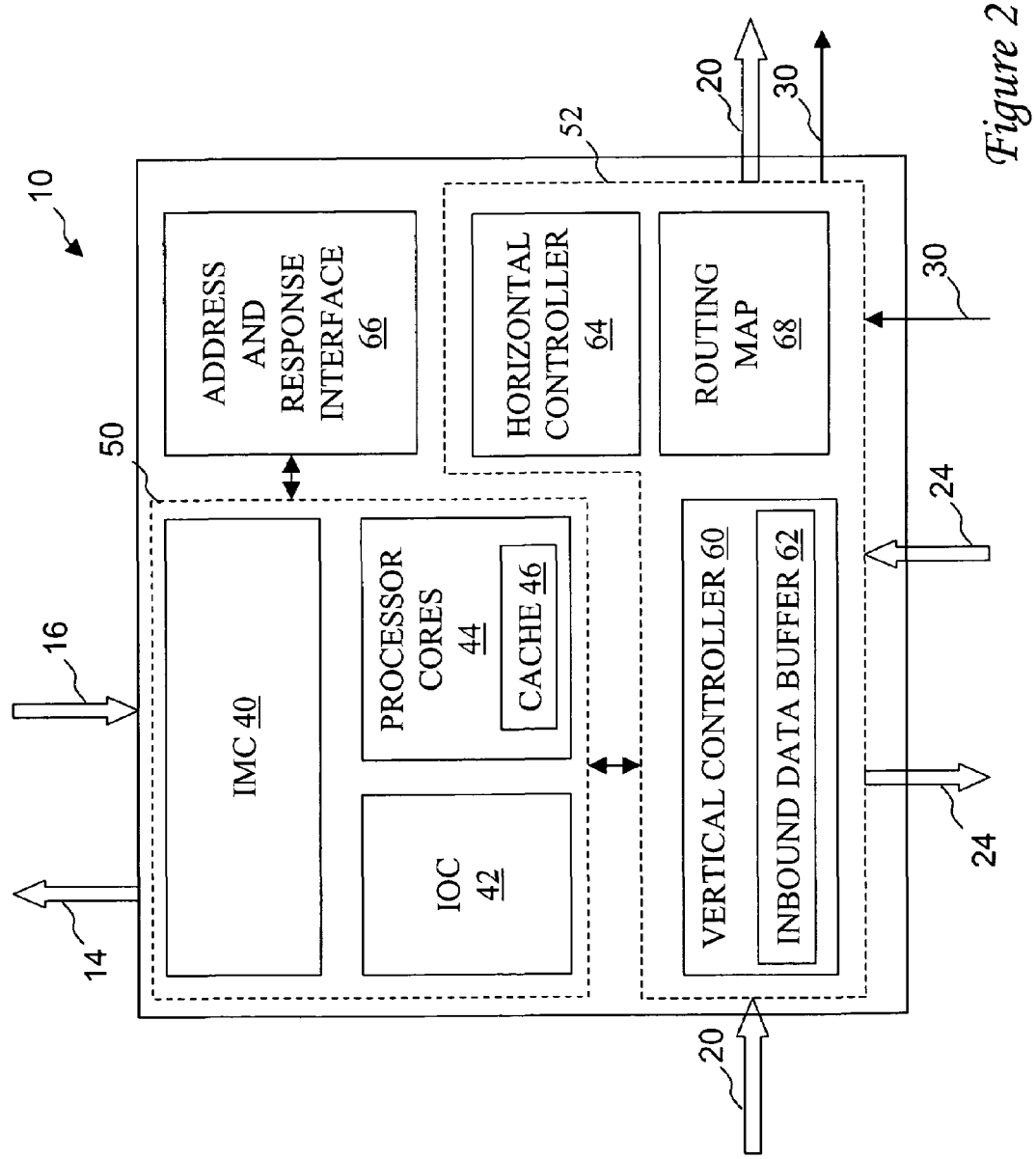
FIG. 2 is a more detailed block diagram of an exemplary processing unit in accordance with one embodiment of the present invention.

Referring now to FIG. 2, there is depicted a block diagram of a PU 10 that can be utilized to implement any or all of PUs 10 within data processing system 8. In a preferred embodiment, each PU 10 is realized as a single integrated circuit device.

As shown in FIG. 2, PU 10 includes one or more processor cores 44 for processing software instructions and data. Processor cores 44 may be equipped with a cache hierarchy 46 to provide low latency storage for instructions and data. Processor cores 44 are coupled to an integrated memory controller (IMC) 40 providing an interface for a memory 12 and an input/output controller (IOC) 42 providing an interface for communication with I/O, storage and peripheral devices. As shown in dashed line illustration, processor cores 44, IOC 42 and IMC 40 (and optionally additional unillustrated circuit blocks) may together be regarded as "local" circuitry 50 that may serve as the source or destination of a data communication on the data interconnect of data processing system 8.

PU 10 further includes controllers that interface PU 10 to the interconnect fabric of data processing system 8. These controllers include address and response interface 66, which handles communication via address and response interconnect 18, as well as a data controller 52 that provides an interface to the data interconnect of data processing system 8. Data controller 52 includes a "horizontal" controller 64 that manages communication on input and output data buses 20 and a "vertical" controller 60 that manages communication on input and output data buses 24. Data controller 52 further includes a routing map 68 indicating possible routes for data communications having each of the possible destination identifiers.

Each data controller 52 within a route between a source PU 10 and a destination PU 10 selects a next hop of the route to be traversed by a data communication based upon a number of factors, including the lengths of the possible routes, a selected priority schema, presence or absence of competing data communications, and optionally, additional factors such as dynamically settable mode bits, detected bus failures, historical traffic patterns, and inter-PU control communication via control buses 30. In general, a data controller 52 selects the shortest available route for a data communication for which no competing data communication having a higher priority is present.

Although the optional control communication utilized to coordinate data communication may include control communication between a "downstream" PU 10 and the "upstream" PU 10 from which the "downstream" PU 10 receives data communication via a data bus 20, the control communication, if present, preferably includes at least communication between partner PUs 28 that may potentially send competing data traffic to the same adjacent PU(s) 10. In exemplary data processing system 8 of FIG. 1, PUs 10a and 10f are partner PUs that may potentially send competing data traffic to PUs 10e and 10b, PUs 10b and 10g are partner PUs that may potentially send competing traffic to PUs 10c and 10f, and PUs 10c and 10h are partner PUs that may potentially send competing traffic to PUs 10g and 10d. By coordinating communication between partner PUs, conflicts between data traffic at the adjacent PUs can be minimized.

With reference now to Table I, below, an exemplary priority schema implemented by data controllers 52 in accordance with the present invention is presented. Table I identifies data communication with respect to a particular PU 10 as H (horizontal) if received from or transmitted on a data bus 20 or 22, V (vertical) if received from or transmitted on a data bus 24, and L (local) if the data communication has the local circuitry 50 of the PU 10 as a source or destination.

In the priority schema given in Table I, the data controller 52 of a PU 10 accords input data communication received on data buses 20 (and data buses 22, if present) the highest priority, regardless of whether or not the destination of the data communication is local circuitry 50, the output data bus 20 (or 22), or the output data bus 24. In fact, data communication received from a data bus 20 (or 22) is non-blocking. Data controller 52 accords traffic received on a data bus 24 the next highest priority regardless of whether the destination is local circuitry 50 or data bus 20, as indicated by a priority of 2. Finally, data controller 52 accords data communication sourced by local circuitry 50 lower priorities on data buses 20 and 24. As between such locally sourced traffic competing for transmission on the same data bus, data controller 52 gives higher priority to traffic having a horizontally or vertically adjacent PU as the ultimate destination.

TABLE I

| Source | Destination | Priority (same destination) |
|---|---|---|
| H | L | 1 (non-blocking) |
| V | L | 2 |
| H | H | 1 (non-blocking) |
| V | H | 2 |
| L | H - next PU | 3 |
| L | H - not next PU | 4 |
| H | V | 1 |
| L | V - next PU | 2 |
| L | V - not next PU | 3 |

It will be appreciated that the exemplary priority schema summarized in Table I can be expanded to provide additional level of prioritization, for example, depending upon the path after the next PU. That is, traffic having a vertical source and a horizontal destination could be further resolved into traffic having a horizontal "next hop" and traffic having a vertical "next hop," with each traffic group having a different priority.

Figure 3:
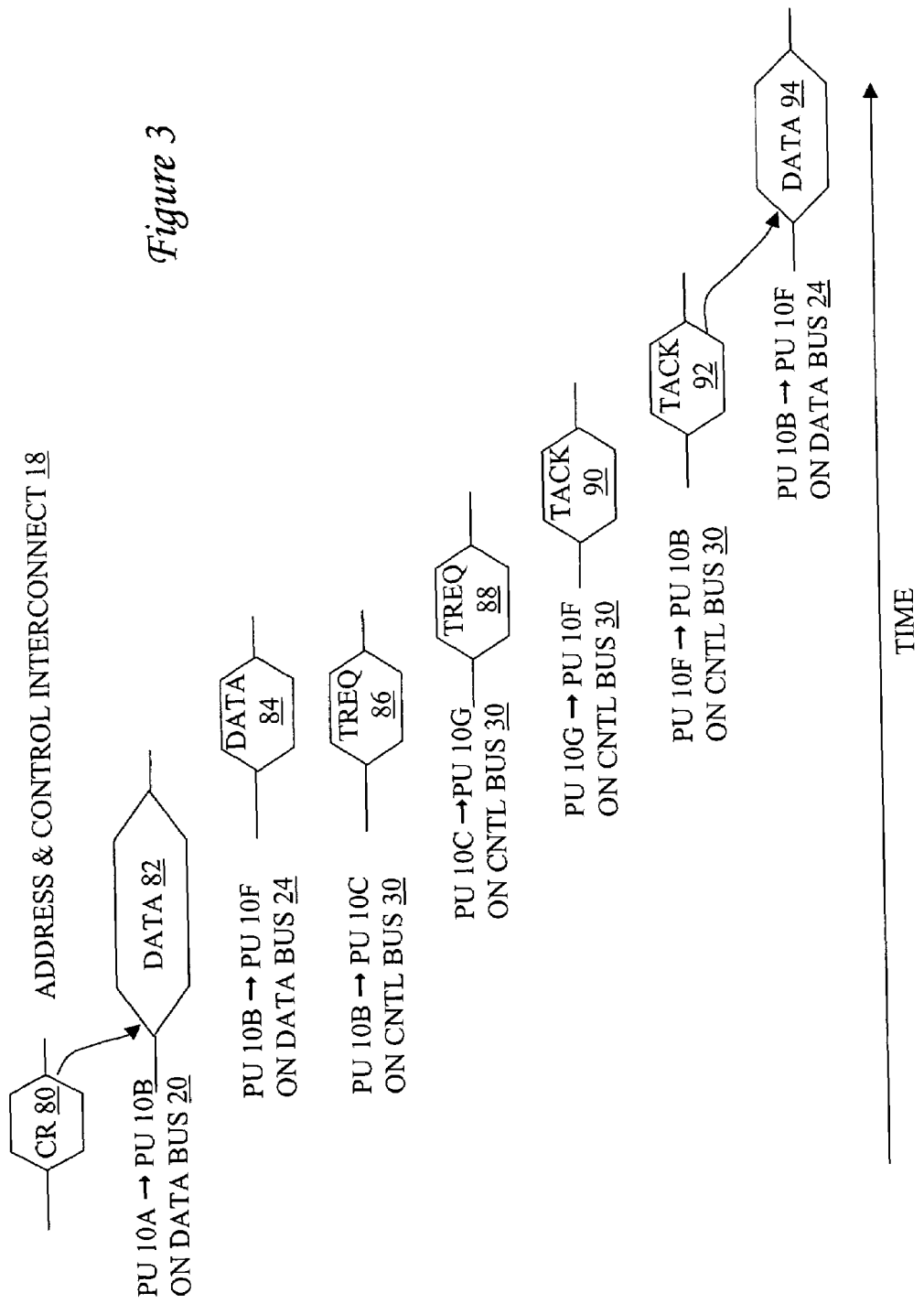
FIG. 3 is a timing diagram of an illustrative data communication scenario in accordance with one embodiment of the present invention.

With reference now to FIG. 3, an exemplary communication scenario is given illustrating the use of control communications between partner PUs (e.g., partner PUs 28) to coordinate the transfer of data between a source PU and a destination PU. In the exemplary communication scenario, PU 10a is the source PU, and PU 10f is the destination PU.

FIG. 3 first illustrates a combined response (CR) 80 to a data access (e.g., read) request by PU 10f. CR 80, which is preferably communicated to all PUs 10 via address and control interconnect 18, identifies PU 10a as the source of the requested data. In response to receipt of CR 80, the local circuitry 50 of PU 10a supplies the requested data to data controller 52, for example, from the associated memory 12 or cache hierarchy 46. Data controller 52 outputs a data communication 82 containing the requested data on its data bus 20 in accordance with the priority schema. That is, horizontal controller 64 of data controller 52 outputs data communication 82 on data bus 20 when no data traffic having data bus 20 as an intermediate destination is received by vertical controller 60 via data bus 24 or received by horizontal controller 64 via data bus 22 (if present). Transmission of data communication 82 may require one or more beats on 8-byte data bus 20.

Figure 4:
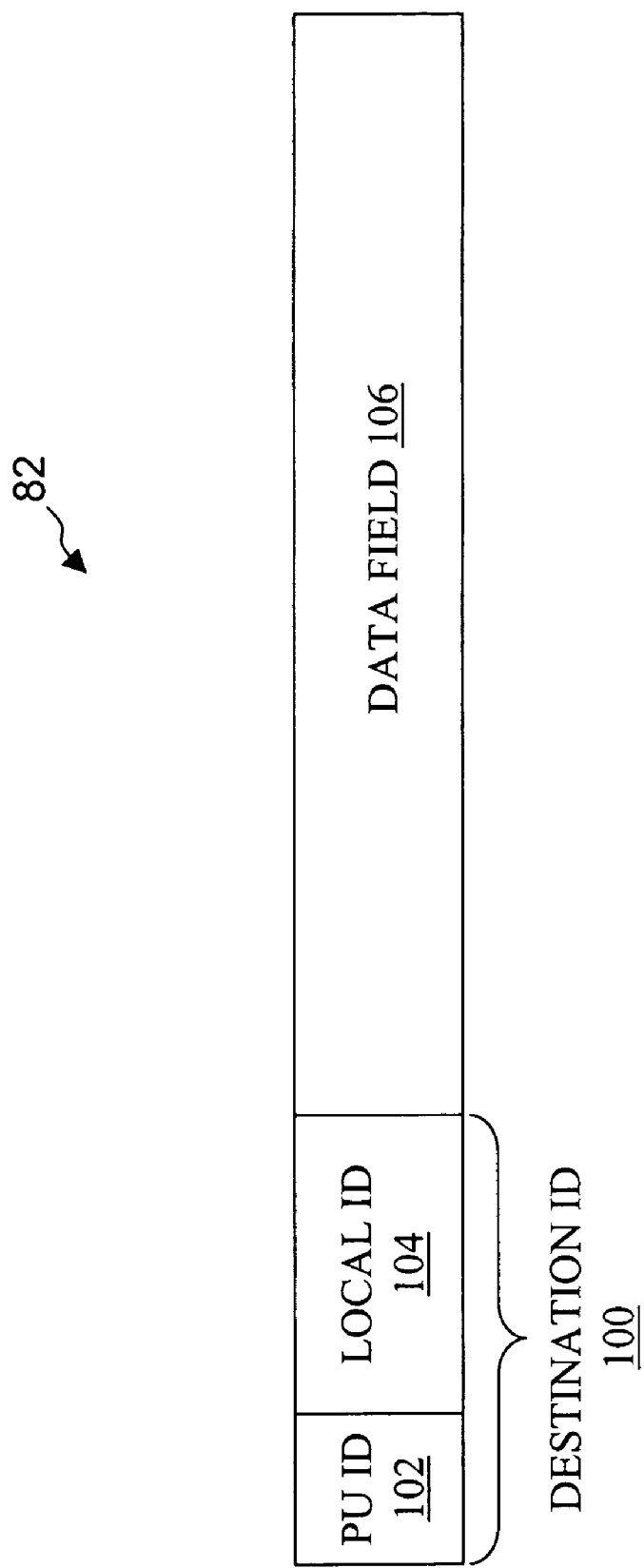
FIG. 4 depicts an exemplary data communication format in accordance with one embodiment of the present invention.

FIG. 4 depicts an exemplary implementation of data communication 82. In the exemplary implementation, data communication 82 comprises a destination identifier (ID) field 100 that specifies at a destination PU 10 and a data payload field 106 that contains the requested data. As shown, destination ID field 100 may optionally include not only a PU ID 102 identifying the destination PU, but also a local ID 104 identifying an internal location within local circuitry 50 in order to facilitate internal routing. Depending upon the desired implementation, data communication 82 may include additional fields, such as a transaction ID field (not illustrated) to assist the destination PU in matching the address and data components of split transactions.

Returning to FIG. 3, in response to receipt of data communication 82, data controller 52 of PU 10b selects data bus 24 from among data buses 20, 24 as the preferred route for the data communication in accordance with the priority schema. Vertical controller 60 therefore sources at least a first data granule 84 of the requested data to processing unit 10f via data bus 24 and, if the first data granule 84 is less than all of the requested data, also issues a transmit request (TREQ) 86 to PU 10*c*. An inbound data buffer 62 within vertical controller 60 of PU 10*f* at least temporarily buffers first data granule 84, and depending upon implementation, may do so until all of the requested data are received.

PU 10*c* forwards a transmit request 88 to PU 10*g*, the partner PU of PU 10*b*. Horizontal controller 64 of PU 10*g* evaluates transmit request 88 in light of the destination of traffic on its output data bus 20 and the priority schema, and outputs on control bus 30 a transmit acknowledgement (TACK) 90 either approving or delaying transmission of the remainder of the requested data from PU 10*b* to PU 10*f*. Horizontal controller 64 outputs a transmit acknowledgement 92 approving the transmission if its output data bus 20 is not carrying any conflicting data traffic and/or if horizontal controller 64 can delay transmission of other data competing traffic (e.g., data traffic of local circuitry 50 within PU 10*g*). On the other hand, if horizontal controller 64 is transmitting data communications destined for the local circuitry of PU 10*f* on its data bus 20 (i.e., a higher priority, competing data communication), horizontal controller 64 will provide a transmit acknowledgment 92 indicating delay. In response to receipt of transmit acknowledgement 90, PU 10*f* transmits a corresponding transmit acknowledgement 92 to PU 10*b* via a control bus 30.

If transmit acknowledgement 92 indicates approval of transmission of the remainder of the requested data, PU 10*b* transmits the remainder of data communication 82 to PU 10*f* in data packet 94. If, on the other hand, transmit acknowledgement 92 indicates delay of transmission of the remainder of the requested data, PU 10*b* delays transmission of the remainder of the requested data until PU 10*g* transmits another transmit acknowledgement indicating approval of transmission (e.g., upon conclusion of transmission of the higher priority, competing data communication).

As has been described, the present invention provides an improved data interconnect and data routing mechanism for a multi-processor data processing system. In accordance with the present invention, a data processing system contains at least first and second series of processing units, each having a respective one of at least first and second segmented data channels. Each segmented data channel comprises one or more data buses each coupling a respective pair of processing units. The data processing system further includes a plurality of inter-series data buses, each coupling one of the processing units in the second series with a respective processing unit in the first series. Communication on the buses is preferably unidirectional and may be coordinated by sideband control communication.

The data interconnect and routing mechanism of the present invention reduces data communication latency and supports dynamic route determination based upon processor activity level/traffic. In addition, the data interconnect and routing mechanism of the present invention implements an architecture that support improvements in communication frequencies that will scale with ever increasing processor frequencies.

While the invention has been particularly shown as described with reference to a preferred embodiment, it will be understood by those skilled in the art that various changes in form and detail may be made therein without departing from the spirit and scope of the invention. For example, those skilled in the art will appreciate that the bus widths specified herein are only given for purposes of illustration and should not be construed as limitations of the invention. It will also be appreciated that other priorities schemas may alternatively be implemented and that different PUs may employ different and yet compatible priority schemas.

What is claimed is:

1. A data processing system, comprising:
   a plurality of processing units including at least first through third processing units;
   data storage coupled to said plurality of processing units;
   an interconnect fabric including at least a first data bus coupling the first processing unit to the second processing unit and a second data bus coupling the third processing unit to the second processing unit, wherein said first and third processing units transmit data traffic to said second processing unit via said first and second data buses; and
   a control channel coupling said first and third processing units, wherein said first processing unit requests approval from said third processing unit via said control channel to transmit a data communication to said second processing unit and said third processing unit approves or delays transmission of said data communication in a response transmitted via said control channel.

2. The data processing system of claim 1, wherein each of said first and said second data buses is unidirectional.

3. The data processing system of claim 1, said interconnect fabric further comprising one or more address channels coupling all of said first, second and third processing units.

4. The data processing system of claim 1, wherein said control channel comprises one or more first control buses coupling said first processing unit to said third processing unit, a second control bus coupling said third processing unit to said second processing unit, and a third control bus coupling said second processing unit to said first processing unit.

5. The data processing system of claim 1, wherein:
   said data processing system further comprises a fourth processing unit;
   said interconnect fabric includes a third data bus coupling said fourth processing unit to said first processing unit;
   said first processing unit includes a data controller regulating data communication by said first processing unit, wherein said data controller selectively routes data traffic to one of said fourth processing unit and said second processing unit based upon at least a priority schema.

6. The data processing system of claim 1, wherein said third processing unit includes a data controller regulating data communication, wherein said data controller within said third processing unit evaluates said request by said first processing unit and provides said response based upon dynamic data traffic conditions.

7. The data processing system of claim 1, said data processing system comprising:
   a first series of M processing units, M being an integer greater than or equal to 2;
   a first segmented data channel including at least M-1 data buses each coupling a respective pair of said M processing units in said first series;
   a second series of N processing units, N being an integer between 2 and M inclusive;
   a second segmented data channel including at least N-1 data buses each coupling a respective pair of said N processing units in said second series; and
   a plurality of inter-series data buses, wherein each of the inter-series data buses couples one of said N processing units in said second series with a respective one of said M processing units in said first series;
   wherein said first series includes said first processing unit, said second series includes said second and third processing units, said first bus is one of said plurality of inter-series buses and said second bus is one of said at least N–1 data buses belonging to said second segmented data channel.

8. A processing unit comprising:

processing circuitry;

an address interconnect interface coupled to said processing circuitry to interface said processing circuitry to an address interconnect; and a data controller coupled to said processing circuitry to interface said processing circuitry to a data interconnect, said data controller including:
  means for transmitting a portion of a data communication to a second processing unit via a first data bus forming a portion of said data interconnect;
  means for transmitting, concurrently within said transmitting of the portion of the data communication, a transmit request to a third processing unit via a control channel; and
  means for transmitting a remainder of said data communication to said second processing unit in a response to receipt of a transmit acknowledge from said third processing unit via said control channel.

9. The processing unit of claim 8, wherein said processing unit has a plurality of output data buses including said data bus, and wherein said data controller further comprises:
  means for routing data communications on selected data buses among said plurality of output data buses.

10. The processing unit of claim 9, wherein said processing unit has a plurality of input data buses, wherein said data controller further comprises:
  means for ordering an outgoing data communication on said data bus in accordance with a priority of an input data bus among said plurality of input data buses from which said data communication was received.

11. A method of data communication in a data processing system including at least first through third processing units, a first data bus coupling the first processing unit to the second processing unit, and a second data bus coupling the third processing unit to the second processing unit, said method comprising:
  said first processing unit transmitting a portion of a data communication to said second processing unit via said first data bus;
  concurrently within said transmitting of the portion of the data communication, said first processing unit transmitting a transmit request to said third processing unit via a control channel; and
  said first processing unit transmitting a remainder of said data communication to said second processing unit in a response to receipt of a transmit acknowledgement from said third processing unit via said control channel.

12. The method of claim 11, wherein said transmitting a portion of a data communication comprises transmitting said portion of a data communication on a data bus that is separate from an address interconnect coupling all of said first, second and third processing units.

13. The method of claim 11, wherein said control channel comprises one or more first control buses coupling said first processing unit to said third processing unit, a second control bus coupling said third processing unit to said second processing unit, and a third control bus coupling said second processing unit to said first processing unit, and wherein said method comprises:
  receiving said transmit acknowledgement from said third processing unit via said second control bus and said third control bus.

14. The method of claim 11, and further comprising:
  said third processing unit evaluating said request by said first processing unit and providing said transmit acknowledgement in response to dynamic data traffic conditions.

* * * * *